April 1, 1930.                F. J. WHITE                1,752,318
              APPARATUS FOR REDUCING SHEATH CURRENTS
                    Original Filed April 8, 1927
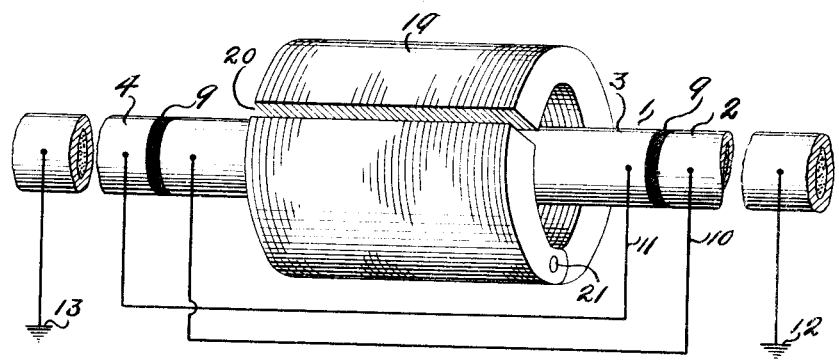
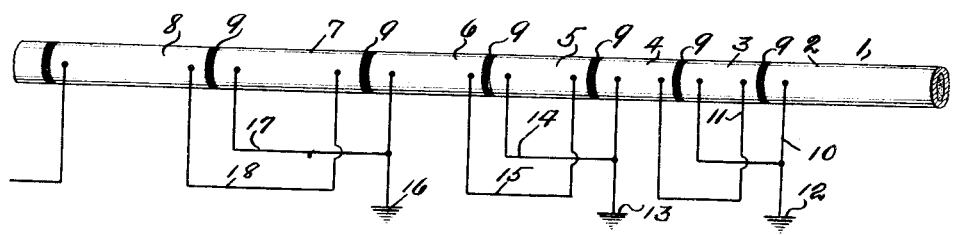
INVENTOR
Francis J. White
BY
Riddle and Margesor
ATTORNEYS Patented Apr. 1, 1930

1,752,318

UNITED STATES PATENT OFFICE

FRANCIS J. WHITE, OF BROOKLYN, NEW YORK, ASSIGNOR TO THE OKONITE COMPANY, OF PASSAIC, NEW JERSEY, A CORPORATION OF NEW JERSEY

APPARATUS FOR REDUCING SHEATH CURRENTS

Original application filed April 8, 1927, Serial No. 181,916. Divided and this application filed February 28, 1928. Serial No. 257,679.

This invention relates to electric apparatus, and particularly to apparatus for use in connection with cables for carrying alternating or pulsating currents, and has for one of its objects the provision of means for reducing the currents induced in the sheath or other cover or coverings of such cables and to be referred to hereinafter as sheath currents.

It is well known that the passage of alternating current through a single conductor cable, or the unbalancing of alternating currents in a multiple conductor cable, induces an electromotive force in the cable sheath or metallic cover which, if this sheath or metallic cover is not connected to ground or to other conducting paths, may produce a dangerous difference of potential between the cable sheath and adjacent structures, and it is a further object of my invention to reduce or, if desired, to neutralize this action.

If this sheath is metallically connected with other conducting paths, so as to form a complete circuit, a current is set up. This so-called sheath current, in addition to the losses in transmission it causes, has an appreciable effect on the heating of the cable, and hence reduces the permissible current in the conductor.

In order that these sheath currents may be reduced and at the same time to permit of grounding or bonding of the cable, I propose to divide the sheath of the cable into discontinuous lengths suitably insulated from each other, and so to connect said discontinuous lengths by suitable conductors that the electromotive force induced in one section is opposed to the electromotive force induced in an adjacent section or sections. Additional to this construction I may provide a member of magnetizable material in position to be magnetized by current flowing in the conductor or conductors of the cable. This member may or may not be constructed with an air gap but in any event the conductors above mentioned together with one of the sheath sections will function as a coil for the magnetizable member.

In my co-pending application Serial No. 181,916, filed April 8, 1927, of which this application is a division, I describe a construction in which the cable sheath is divided into discontinuous lengths suitably insulated from each other, members composed of magnetizable material being placed at proper intervals about these discontinuous lengths, these members being provided with a winding or coil the ends of which are attached to adjacent sheath lengths.

In all cases, however, as the electromotive force induced in the sheath or metallic cover is proportional to the current flowing in the conductor of the cable, or in multiple conductor cables proportional to the vector sum of the currents, it is obvious that by properly connecting the sections of the sheath to each other, the effect of the elecromotive force induced in any specified length of sheath may be neutralized. In those instances where a member of magnetizable material is provided about a sheath section this member should be proportioned as to operate below the saturation point if it is desired to have complete neutralization at all loads. If, however, complete neutralization at the heavier loads is not desired then the core may work beyond the saturation point.

In the drawings accompanying this application Fig. 1 shows one embodiment of my invention and Fig. 2 shows another embodiment of my invention.

Both figures of the drawing are more or less diagrammatic.

In Fig. 1 I show a cable 1, which may be either of the single conductor or the multiple conductor type, the sheath of which is composed of sections, 2, 3, 4, 5, 6, 7, 8, etc., adjacent sections being insulated from each other as indicated at 9. Attached to the section 2 is one end of a conductor 10, the other end being connected to the end of the section 3 remote from the section 2. To the opposite end of this section 3 is connected a conductor 11, the other end of which is connected to the end of the sheath section 4 adjacent the section 3. The conductor 10 is grounded at 12.

The end of the sheath section 4 adjacent the sheath section 5 is grounded as indicated at 13 and to this ground and to the end of sheath section 5 remote from the sheath section 4 is connected a conductor 14. Connected to the opposite end of sheath section 5 is connected a conductor 15, the opposite end of which is connected to the end of section 6 adjacent the section 5. The opposite end of the section 6 is grounded as indicated at 16, and connected to this ground and the end of sheath section 7 remote from the sheath section 6 is a conductor 17, while 18 designates a conductor connecting the end of sheath section 7 adjacent sheath section 6 and the end of sheath section 8 adjacent sheath section 7.

This provides a construction, therefore, applicable to single conductor or to multiple conductor cables in which the electromotive force induced in one sheath section is opposed to the electromotive force induced in another section, specifically an adjacent section. For example the sheath sections 5 and 6 are so connected to each other by the conductor 15, that the electromotive force induced in the sheath section 6 due to current in the conductor or conductors of the cable is opposed by the electromotive force induced in sheath section 5.

With the above construction the flow of sheath current is reduced and may be neutralized provided the sheath sections are of proper lengths to balance each other.

To make this construction commercially practicable it will be understood that the longitudinal portions of the conductors 10, 11, etc., must be placed some distance from or magnetically shielded from the magnetic effect of the current in the conductor or conductors of the cable.

While in the construction above described the flow of sheath current can be reduced and even neutralized if desired by proper division of the sheath, a construction such as illustrated in Fig. 2 may be preferred in some instances.

In Fig. 2 I have placed a member 19 of magnetizable laminated material and having an adjustable air gap 20 about the section 3 of the cable sheath and in inductive relation to the current flowing in the conductor or conductors of the cable thereby increasing the induced voltage in sheath section 3. While the conductors 10 and 11 so connect sections 2, 3 and 4 that the electromotive force induced in the section 3 is opposed to the electromotive force induced in the adjacent sections 2 and 4, the provision of the member 19 increases the induced voltage in the sheath section 3 and permits of a relatively short length of sheath to neutralize a longer length.

As above mentioned the member 19 is of laminated construction with adjustable air gap 20, adjustment of this gap being effected by adjustment of the laminations about the pivoted connection 21. On the other hand the laminations composing this member could be solid rings, and by changing the number of rings or laminations to vary the reluctance of the magnetic circuit of the member 19 the same effect electrically could be obtained.

In both embodiments of my invention, therefore, I have provided a construction in which the electromotive force induced in one sheath section is opposed to the electromotive force induced in another sheath section, specifically an adjacent sheath section. In the construction of Fig. 2, however, I provide for the electromotive force induced in one sheath section to oppose the electromotive force induced in adjacent sheath sections.

As above pointed out, and as will be clear to those skilled in this art, my invention is applicable to multiple conductor cables as well as single conductor cables, and the appended claims, it is to be clearly understood, are to be so interpreted.

What I claim is:—

1. An insulated cable in which the sheath thereof is divided into discontinuous lengths insulated from each other, and conductors directly connecting the said sheath lengths so that the electromotive force induced in one length is opposed to the electromotive force induced in another length of the same sheath of the same cable.

2. An insulated cable in which the sheath thereof is divided into discontinuous lengths insulated from each other, and conductors directly connecting adjacent lengths so that the electromotive force induced in one length is opposed to the electromotive force induced in an adjacent length of the same sheath of the same cable.

3. An insulated cable in which the sheath thereof is divided into discontinuous lengths insulated from each other, and conductors connecting an intermediate sheath length to adjacent lengths so that the electromotive force induced in the intermediate length opposes the electromotive force induced in lengths of the same sheath adjacent the intermediate length.

4. An insulated cable in which the sheath thereof is divided into discontinuous lengths insulated from each other, a member of magnetizable material disposed about one of said lengths, and conductors for connecting the last mentioned sheath length to adjacent sheath lengths, said conductors and the sheath length about which the magnetizable member is disposed cooperating with said magnetizable member.

5. An insulated cable in which the sheath thereof is divided into discontinuous lengths insulated from each other, a member of magnetizable material, conductors for connecting adjacent sheath lengths, said member of magnetizable material being in inductive relation to current passing through the conductors of the cable and adjacent one of said sheath lengths, said sheath length and said conductors cooperating with said magnetizable member to function as a coil for the magnetizable member.

6. An insulated cable in which the sheath thereof is divided into discontinuous lengths insulated from each other, a laminated magnetizable member surrounding an intermediate sheath length and conductors connecting said intermediate sheath length to adjacent lengths.

7. An insulated cable in which the sheath thereof is divided into discontinuous lengths insulated from each other, a magnetizable member disposed about an intermediate length, the reluctance of the magnetic circuit of said magnetizable member being adjustable, and conductors connecting the said intermediate sheath length to others of said sheath lengths and cooperating with the intermediate sheath length and said magnetizable member.

This specification signed this 23rd day of February, 1928.

FRANCIS J. WHITE.